US010530875B2

(12) United States Patent
Niewczas

(10) Patent No.: US 10,530,875 B2
(45) Date of Patent: Jan. 7, 2020

(54) CUSTOMIZING MEDIA CONTENT ON ONLINE SOCIAL NETWORKS

(71) Applicant: Facebook, Inc., Menlo Park, CA (US)

(72) Inventor: Mateusz Marek Niewczas, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 451 days.

(21) Appl. No.: 14/836,300

(22) Filed: Aug. 26, 2015

(65) Prior Publication Data
US 2017/0063953 A1 Mar. 2, 2017

(51) Int. Cl.
*H04L 29/08* (2006.01)
*G06Q 10/06* (2012.01)
*H04W 4/21* (2018.01)
*H04W 4/80* (2018.01)
*H04W 12/00* (2009.01)
(Continued)

(52) U.S. Cl.
CPC ...... *H04L 67/20* (2013.01); *G06Q 10/063112* (2013.01); *G06Q 30/0251* (2013.01); *G06Q 50/01* (2013.01); *H04L 67/18* (2013.01); *H04L 67/22* (2013.01); *H04L 67/306* (2013.01); *H04W 4/06* (2013.01); *H04W 4/21* (2018.02); *H04W 4/80* (2018.02); *H04W 12/00503* (2019.01)

(58) Field of Classification Search
CPC ......... H04L 67/20; H04L 67/18; H04L 67/22; H04L 67/306; H04W 4/04; H04W 4/06; H04W 4/21; H04W 4/80; H04W 12/00503; G06Q 50/01; G06Q 30/0361; G06Q 30/0251; G06Q 30/02; G06Q 10/063112
See application file for complete search history.

(56) References Cited

U.S. PATENT DOCUMENTS 8,627,438 B1 1/2014 Bhimanaik
8,775,415 B2 * 7/2014 Jeon ................... H04N 5/44543
707/721
(Continued)

OTHER PUBLICATIONS

U.S. Appl. No. 14/836,245, filed Aug. 26, 2015, Niewczas.
U.S. Appl. No. 14/836,206, filed Aug. 26, 2015, Niewczas.
U.S. Appl. No. 15/240,910, filed Aug. 18, 2016, Niewczas.

*Primary Examiner* — Thu V Nguyen
*Assistant Examiner* — Angela M Widhalm De Rodrig
(74) *Attorney, Agent, or Firm* — Baker Botts L.L.P.

(57) ABSTRACT

In one embodiment, a method includes receiving, from a media-player device associated with a social-networking system, an indication that a plurality of client systems of a plurality of users of an online social network, respectively, are proximate to the media-player device. Each of the users is logged into a native application associated with the social-networking system on a respective client system. The media-player device is communicatively coupled to a display screen. The social-networking system may access, in response to the received indication, social-networking information and watch-history information of each user. The social-networking system may select one or more media-content items from a plurality of media-content items based on the social-networking information and watch-history information of each user. The social-networking system may send, to the media-player device, the one or more selected media-content items and instructions to send the selected media-content items to the display screen for display to the users.

41 Claims, 7 Drawing Sheets

(51) Int. Cl.
  *G06Q 30/02* (2012.01)
  *H04W 4/06* (2009.01)
  *G06Q 50/00* (2012.01)

(56) References Cited

U.S. PATENT DOCUMENTS

| | | | | |
|---|---|---|---|---|
| 9,021,517 | B2* | 4/2015 | Selim | H04N 5/44 |
| | | | | 725/16 |
| 9,137,558 | B2* | 9/2015 | Gibbon | H04H 60/45 |
| 9,311,308 | B2* | 4/2016 | Sankarasubramaniam | |
| | | | | H04N 21/4532 |
| 9,407,751 | B2* | 8/2016 | Hansen | G06F 9/4451 |
| 9,564,175 | B2* | 2/2017 | Acharya | G11B 27/10 |
| 9,639,608 | B2* | 5/2017 | Freeman | G06Q 50/01 |
| 9,660,950 | B2* | 5/2017 | Archibong | H04L 51/32 |
| 9,685,072 | B2* | 6/2017 | Patel | G08C 17/00 |
| 9,769,564 | B2* | 9/2017 | Goran | H04R 3/002 |
| 10,356,035 | B1* | 7/2019 | Gravino | H04L 51/32 |
| 2007/0169165 | A1 | 7/2007 | Crull | |
| 2009/0298514 | A1 | 12/2009 | Ullah | |
| 2010/0082727 | A1 | 4/2010 | Zalewski | |
| 2011/0246440 | A1* | 10/2011 | Kocks | H04N 21/472 |
| | | | | 707/706 |
| 2012/0222135 | A1* | 8/2012 | Chavez | H04N 21/4104 |
| | | | | 726/29 |
| 2013/0332308 | A1* | 12/2013 | Linden | G06Q 30/0631 |
| | | | | 705/26.7 |
| 2014/0012918 | A1* | 1/2014 | Chin | G06Q 50/01 |
| | | | | 709/204 |
| 2014/0067828 | A1* | 3/2014 | Archibong | H04L 65/4084 |
| | | | | 707/748 |
| 2014/0100955 | A1* | 4/2014 | Osotio | G06F 3/011 |
| | | | | 705/14.55 |
| 2014/0156791 | A1* | 6/2014 | Sant | G06F 17/30058 |
| | | | | 709/217 |
| 2014/0282967 | A1 | 9/2014 | Maguire | |
| 2015/0294221 | A1* | 10/2015 | Andres Gutierrez | |
| | | | | G06Q 30/0261 |
| | | | | 706/46 |
| 2015/0294634 | A1* | 10/2015 | Jung | H04L 51/32 |
| | | | | 345/212 |
| 2016/0292734 | A1* | 10/2016 | Jia | G06Q 30/0256 |
| 2016/0358214 | A1* | 12/2016 | Shalunov | G06Q 30/0241 |
| 2017/0032470 | A1* | 2/2017 | Watanachote | G06Q 50/01 |

* cited by examiner

CUSTOMIZING MEDIA CONTENT ON ONLINE SOCIAL NETWORKS

TECHNICAL FIELD

This disclosure generally relates to customizing media content, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may register a user to a media-device player when the user's authenticated client system is proximate to the media-device player in order to enhance the user's media-viewing experience. The media-player device may have social-networking functionality, and may communicate with a social-networking system. The media-device player may be coupled—via a wired or wireless connection—to a display screen (e.g., television), and the media-device player may provide streaming media content (e.g., television shows, movies, music, music videos, or any other suitable media content) for display on the display screen. As an example and not by way of limitation, the media-player device may retrieve the media content for streaming, via a wireless internet connection, directly from third-party content providers. When multiple users are registered to a media-player device (i.e., a client system of each of the multiple users has been authenticated to the media-player device and media-player device has recorded/stored a record of each user as being associated with an authenticated client system) and a client system of each of the users is within a threshold distance of the media-player device (i.e., the users are within a viewing distance), the social-networking system may push customized media content items to the media-player device for display to the users at the display screen. The social-networking system may analyze the social-networking information and watch-history information of each of the viewing users to determine recommended content or advertisements to splice into streaming content.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
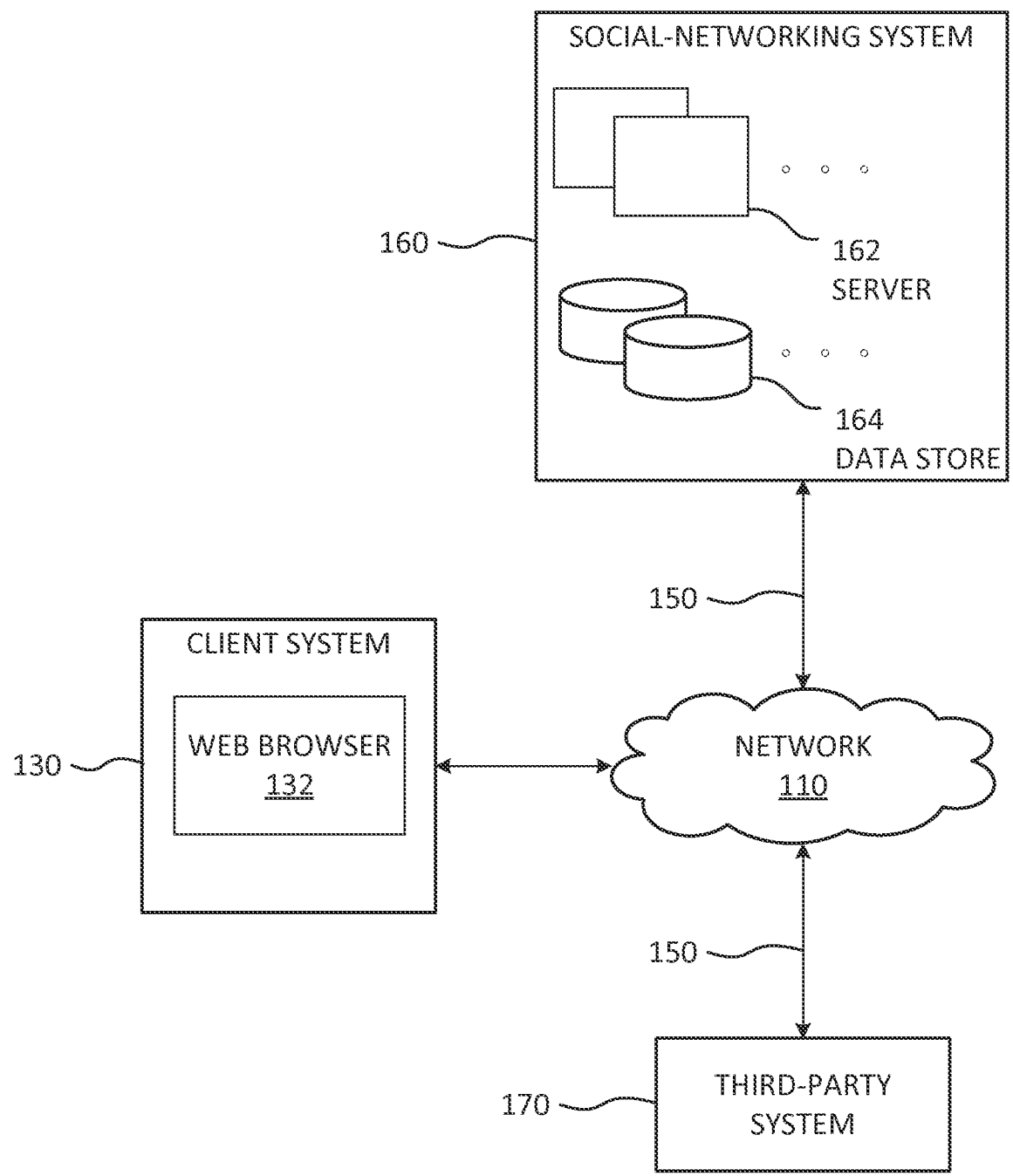
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
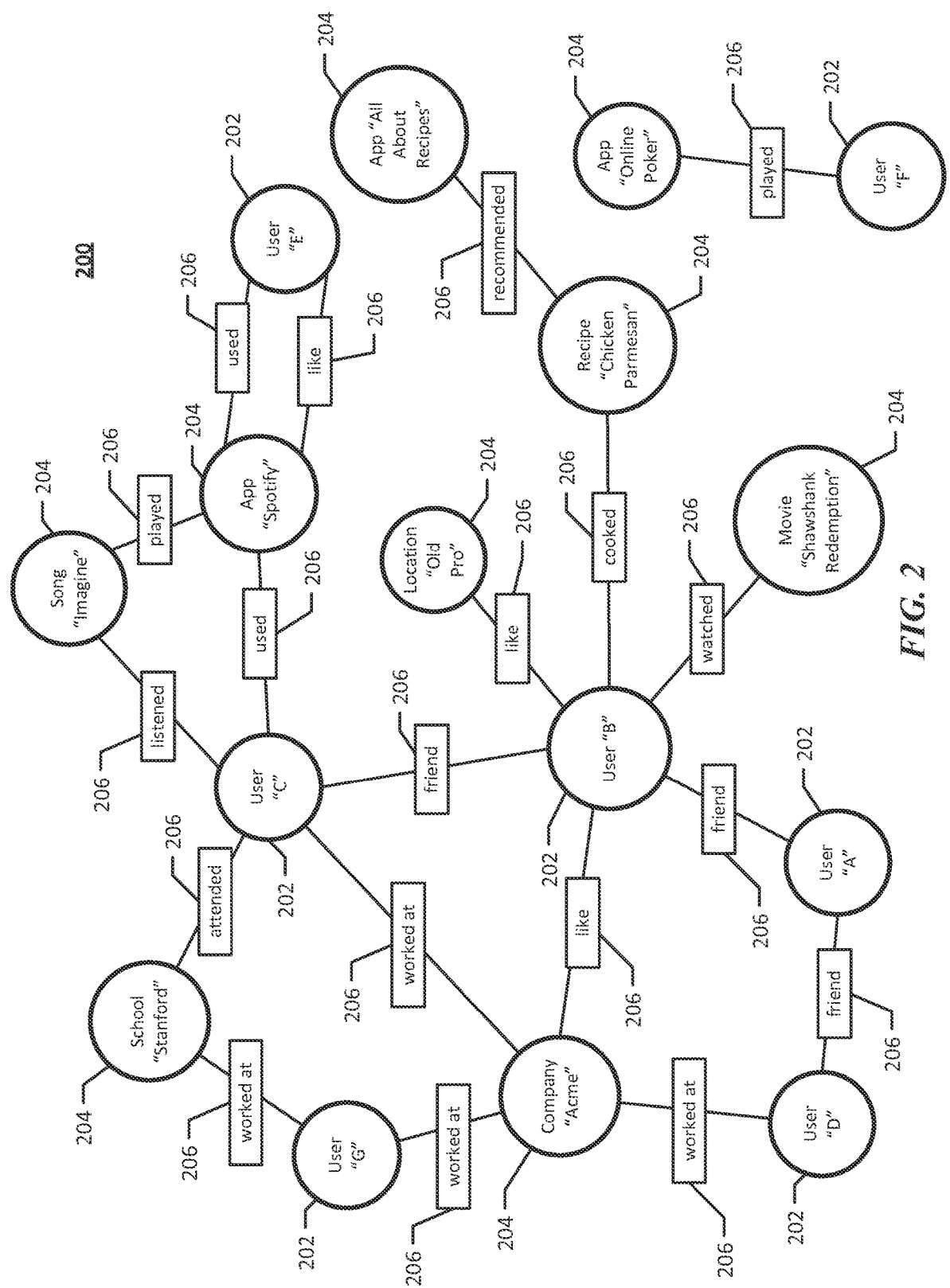
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Customizing Media Content

In particular embodiments, upon authentication of a user's client system 130, the user may be registered to a media-player device associated with social-networking system 160. A first user may be registered as an owner of the media-player device, and any suitable number of second users may be registered as guest users of the media-player device. When multiple registered users (i.e., an audience) are within range of a media-player device, social-networking system 160 may provide customized media content to the media-player device for display at a display screen to the users in the audience. Social-networking system 160 may customize the content to the multiple registered users (e.g., based on common interests and preferences of the users).

Figure 3:
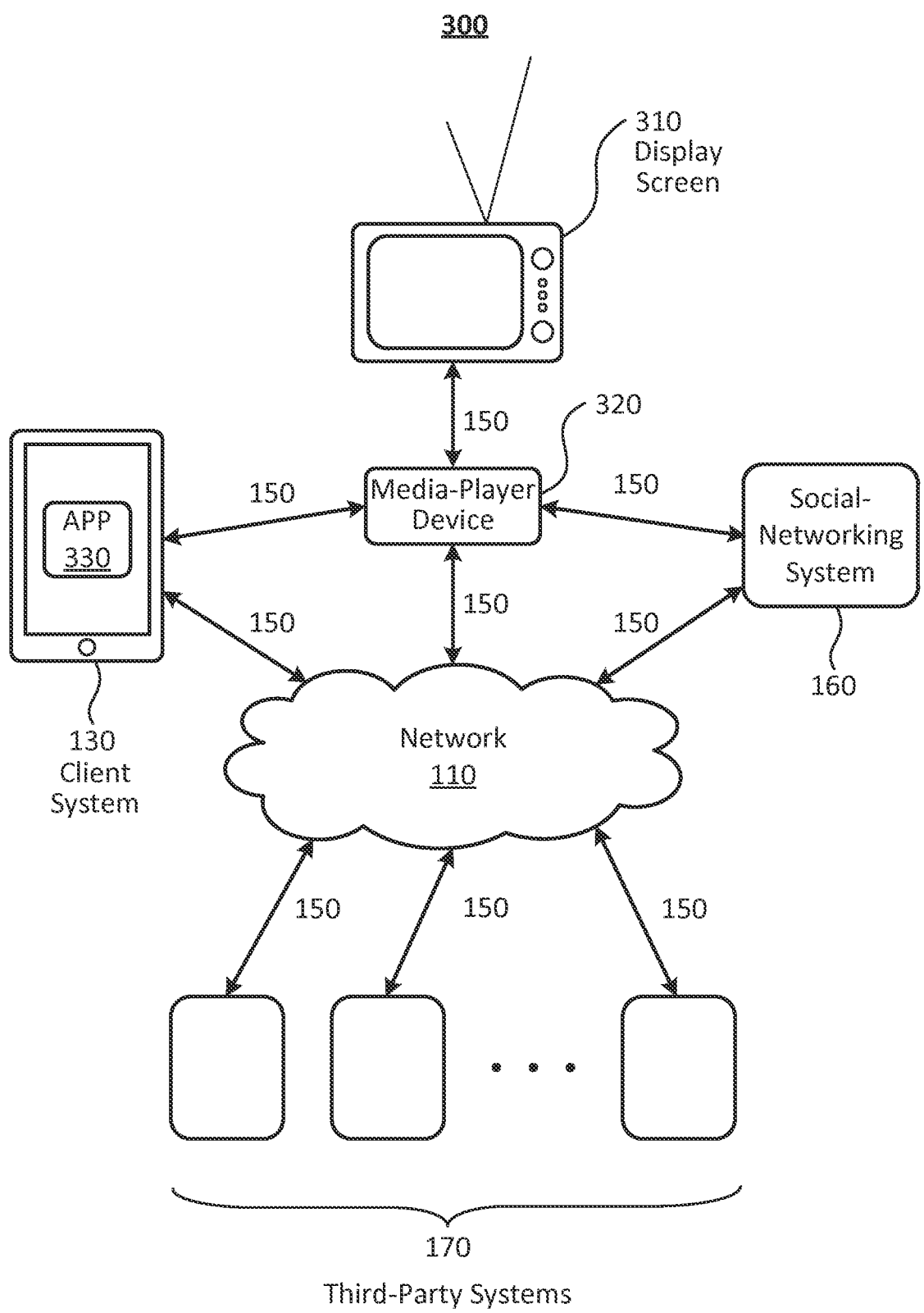
FIG. 3 illustrates an example media-player device environment associated with a social-networking system.

FIG. 3 illustrates an example media-player device environment 300 associated with a social-networking system 160. Media-player device environment 300 includes a media-player device 320, a display screen 310, a client system 130, a social-networking system 160, and third-party systems 170, each connected to a network 110. Media-player device 320 may be communicatively coupled to display screen 310 by a wired or wireless connection. Client system 130 and social-networking system 160 are shown as connected to each other by media-player device 320. Although FIG. 3 illustrates a particular arrangement of media-player device 320, display screen 310, client system 130, social-networking system 160, third-party systems 170, and network 110, this disclosure contemplates any suitable arrangement of media-player device 320, display screen 310, client system 130, social-networking system 160, third-party systems 170, and network 110. As an example and not by way of limitation, client system 130 and social-networking system 160 may be connected to each other directly, bypassing media-player device 320 and network 110. As another example, media-player device 320 and display screen 310 may be connected to each other via network 110. Although FIG. 3 illustrates one client system 130, any suitable number of client systems 130 may be authenticated to media-player device 320. As described above, in connection with FIG. 1, links 150 may connect media-player device 320, display screen 310, client system 130, social-networking system 160, and third-party systems 170 to network 110 or to each other. Although FIG. 3 illustrates a particular number of third-party systems 170, this disclosure contemplates any suitable number of third-party systems 170.

As used herein, media-player device 320 may be any device suitable for wirelessly communicating with any number of client systems 130 proximate to the media-player device. Media-player device 320 may be communicatively coupled, via a wireless or wired connection, to at least one display screen 310 and able to communicate wirelessly with social-networking system 160. Media-player device 320 may send and receive wireless communications via, as an example and not by way of limitation, short-range radio frequencies (e.g., short-range radio BLUETOOTH) or any other suitable wireless communication method, particularly short-range wireless communication methods (e.g., less than approximately 300 feet). A media-player device may be able to communicate wirelessly with one or more third-party systems 170. Third-party systems 170 may be associated with third-party content providers, including, as an example and not by way of limitation, owners and/or distributors of media content (e.g., music and visual media content). When a user's client system 130 comes into range of a media-player device (e.g., a client system 130 may be in range of a media-player device if it is in range of at least one antenna of the media-player device 320 and can receive a signal from the at least one antenna of media-player device 320), client system 130 may be authenticated to the media-player device based on wireless communications between client system 130 and the media-player device 320. The user of client system 130 may then be registered to the media-player device 320 based on the authentication of the user's client system 130. Authentication of client systems 130 and registration of users to media-player device 320 may be performed as described in U.S. patent application Ser. No. 14/836,206, titled "Authenticating Users to Media-Player Devices on Online Social Networks" filed 26 Aug. 2015 and U.S. patent application Ser. No. 14/836,245, titled "User-Defined Coverage of Media-Player Devices on Online Social Networks" filed 26 Aug. 2015, each of which is incorporated by reference herein.

In particular embodiments, social-networking system 160 may receive, from media-player device 320, an indication that a client system 130 of a registered user of the online social network is proximate to media-player device 320. The user may be logged into a native application 330 on client system 130, which may communicate with media-player device 320, and media-player device 320 may determine that the user is proximate based on the communication. In particular embodiments, social-networking system 160 may receive, from media-player device 320, an indication that more than one client system 130 of more than one respective registered user is proximate to media-player device 320. These users may be logged into native application 330 associated with social-networking system 160 running on their respective client systems 130, which may be within range of media-player device 320. As an example and not by way of limitation, the users within range of media-player device 320 may collectively form an audience for the media-player device 320.

In response to the received indication that particular users are proximate to media-player device 320 and logged into the social-networking system 160 via native application 330, social-networking system 160 may access social-networking information and watch-history information of each of the users. Social-networking system 160 may use this accessed information to formulate content recommendations or to place advertisements, which are specific to the particular audience of media-player device 320. In particular embodiments, when a user is registered to media-player device 320, social-networking information of the user may be sent to media-player device 320. The particular social-networking information received at media-player device 320 may include, as an example and not by way of limitation, an identifier for the user. Media-player device 320 may send this identifier for each of the users in the audience to social-networking system 160 as part of the indication that the users are proximate and logged into the social-networking system 160, and social-networking system 160 may use these identifiers to access social-networking information for the users. Watch-history information may be stored in association with a user profile on social-networking system 160. In this manner, media-player device 320 may convey to social-networking system 160 the identities of the users in an audience viewing display screen 310—which may be communicatively coupled to media-player device 320—and social-networking system 160 may, in turn, access information about each of the audience members.

Social-networking information of a user may include, as an example and not by way of limitation, user-demographic information (e.g., age, gender, ethnicity, location), biographical information (e.g., name, picture, birthday, and astrological sign), preferences (e.g., television show, music, book, movie, and food preferences), social-networking actions taken by the user (e.g., pages/posts liked or followed by the user), social-networking information of the user's connections in social graph 200 (e.g., first-degree connections), or any other suitable social-networking information, subject to privacy preferences of the user or other restrictions imposed by the social-networking system. Watch-history information of a user may include, as an example and not by way of limitation, media content watched or otherwise interacted with by the user, advertisement information (e.g., advertisements shown and advertisements conversions). Watch-history information may be accessed by the social-networking system 160 for the media-player device 320 to which the user is currently proximate or to any other media-player device 320 to which the user has been registered. As an example and not by way of limitation, a first user may be registered as an owner of a particular media-player device 320 and as a guest user of other media-player devices 320 (e.g., owned by friends of the user), and watch-history information may be retrieved by the social-networking information 160 from any of the media-player devices 320 with which the user has interacted.

Social-networking system 160 may select one or more media-content items from a set of media-content items based on the social-networking information and watch-history information of each of the users in the audience. Media-content items may include, as an example and not by way of limitation, video content, audio content, images, any other suitable media content, or any combination thereof. Media content items may be, as an example and not by way of limitation, retrieved by social-networking system 160 from one or more third-party systems 170, generated by social-networking system 160, or generated or published to an online social network by one or more users of social-networking system 160. The selected media-content items may be, as an example and not by way of limitation, a content recommendation (e.g., a television show) or an advertisement (e.g., based on the users' common interests).

In particular embodiments, social-networking system 160 may analyze the social-networking information and watch-history information of the users in the audience to determine commonalities between one or more of the users. As an example and not by way of limitation, social-networking system 160 may determine that social-networking information of each of the users indicates that the each has expressed an affinity for a particular television program, and a new episode just became available for this television program. Social-networking system 160 may then select the new episode of the television program to be presented as a content recommendation to the users. Social-networking system 160 may select a media-content item based on commonalities in social-networking information and/or watch-history information of a subset of the audience (i.e., fewer than all of the users present). As another example and not by way of limitation, watch-history information of two users in an audience of three may indicate that the two users have frequently watched a particular spy drama show, and social-networking system 160 may then push the spy drama show as a content recommendation for the three audience members to watch so that the third user may be exposed to the show that the other two users watch.

In particular embodiments, social-networking system 160 may calculate affinity coefficients between users in order to predict which content recommendation or advertisements (i.e., media-content items) are most likely to be of interest to one or more users of the audience. As an example and not by way of limitation, a first user of the audience may be registered as the owner of media-player device 320 and one or more second users of the audience may be registered as guest users of media-player device 320. In the same example, social-networking system 160 may determine that social-networking information may indicate a close relationship between the owner of the media-player device and a guest user (i.e., a high affinity coefficient may be determined between the two users) based on shared interests, frequency of communication, any other suitable social-networking information of the users. In the same example, the owner of the media-player device may routinely watch a particular docuseries, but watch-history information of the guest user indicates that the guest user has never seen the docuseries. Social-networking system 160 may then determine, based on the high affinity coefficient, that the guest user may also be interested in the docuseries and may select a content recommendation directed to the docuseries.

In particular embodiments, social-networking system 160 may determine affinity coefficients between users in an audience using social graph 200 and social-networking information of the users. A first node of social graph 200 may correspond to the owner of media-player device 320, and one or more second nodes of social graph 200 may correspond to one or more guest users of media-player device 320. In particular embodiments, the first node may be within one degree of separation of each second node in social graph 200 corresponding to second users in the audience (i.e., each guest user is a first-degree social connection of the owner of media-player device 320). Social-networking information of the owner may include one or more affinity coefficients of the first node with respect to one or more second nodes corresponding to the one or more guest users. These affinity coefficients may be based on, as an example and not by way of limitation, one or more edges connecting the first node to the one or more second nodes. As an example and not by way of limitation, more edges may indicate more levels of commonality between the owner (i.e., corresponding to the first node) and a guest user (i.e., corresponding to a second node). Social-networking system 160 may use these affinity coefficients determined between the first node and one or more second nodes to select the one or more media-content items. As an example and not by way of limitation, an affinity coefficient between the owner and a guest user may be particularly high, and social-networking system 160 may determine, based on this affinity coefficient, that the owner may be interested in a media-content item that is of interest to the guest user (e.g., the guest user's watch-history indicates that he has watched a particular movie ten times). In particular embodiments, if no media-content item may be selected based on affinity coefficients between the users in the audience, then social-networking system 160 may select a media-content item based on the social-networking information and watch-history information of the registered owner of media-device player 320.

In particular embodiments, social-networking system 160 may select the one or more media-content items based on affinity coefficients between nodes corresponding to users and nodes corresponding to concepts in social graph 200. As an example and not by way of limitation, one or more users may have interacted with a page corresponding to a particular tennis player (i.e., these users have demonstrated affinities for the tennis player), and social-networking system 160 may select a media-content item related to this demonstrated affinity (e.g., a video of a tennis match in which that player is competing).

In particular embodiments, social-networking system 160 may select the one or more media-content items based additionally on context information associated with the users. Context information may include, as an example and not by way of limitation, current or predicted weather information, geographic location information, current time of day, any other suitable context information, or any combination thereof. As an example and not by way of limitation, social-networking system may select an advertisement for a pizza parlor to insert into a stream of media content for the users based on context information indicating that the users are currently at a geographic location near the pizza parlor and context information indicating that the it is dinner time (e.g., 7 pm) where the users are located.

Social-networking system 160 may send, to media-player device 320, the one or more selected media-content items and instructions to send the one or more selected media-content items to display screen 310 for display to the users (i.e., the audience of users). As an example and not by way of limitation, social-networking system 160 may send, to media-player device 320, one or more media-content items that are content recommendations (e.g., movies to watch), and media-player device 320 may, in turn, send the content recommendations to display screen 310 for display to the users on a home screen presented by media-player device 320. In another example and not by way of limitation, social-networking system 160 may send, to media-player device 320, one or more media-content items that are advertisements (e.g., based on common or predicted interests of one or more of the users), and media-player device 320 may then send the advertisements to display screen 310 for insertion into streaming or stored media content. FIGS.

4 and 5 depict and describe example presentations of selected one or more media-content items to an audience of users at display screen 310.

Figure 4:
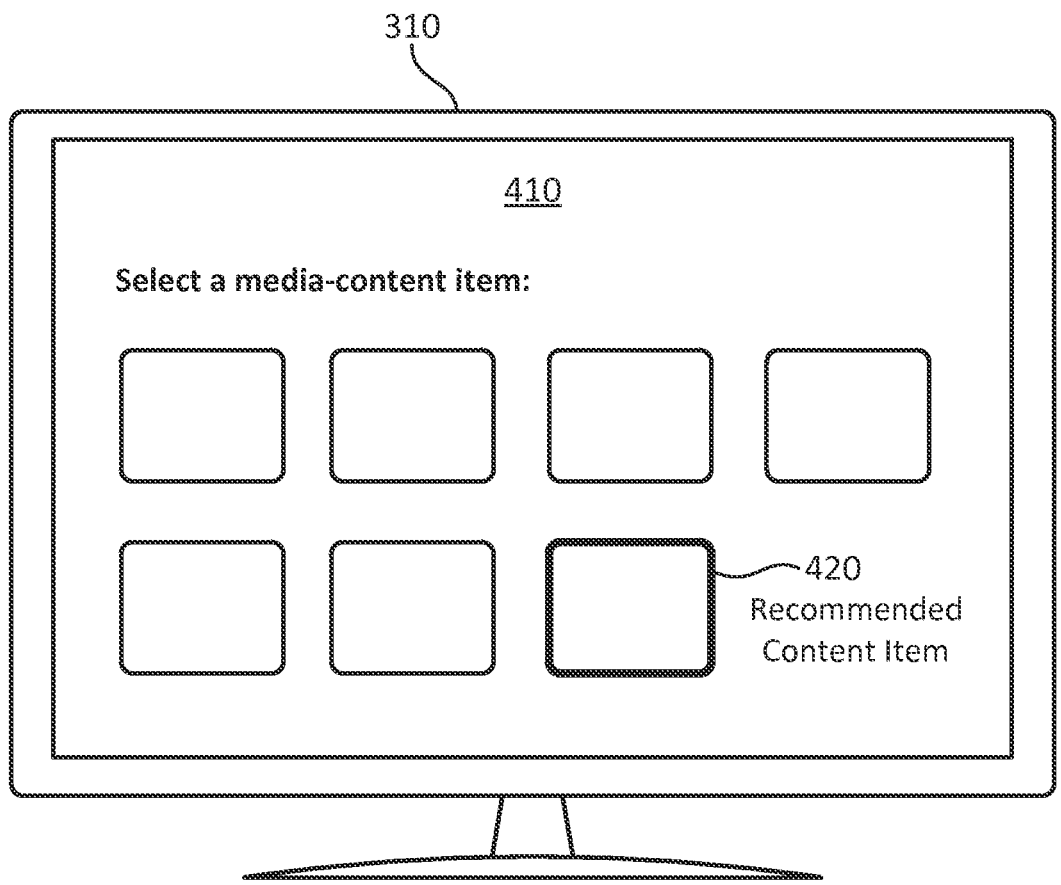
FIG. 4 illustrates an example content recommendation interface.

FIG. 4 illustrates an example content recommendation interface 410. Content recommendation interface may be presented on display screen 310 after being sent by media-player device 320. Content recommendation interface 410 may be a home screen of display screen 310, a screen personalized to the owner of media-player device 320, or any other suitable interface of display screen 310. Content recommendation interface 410 is shown in FIG. 4 as including a particular number of media-content items, but any suitable number of media-content items may be presented in content recommendation interface 410. Content recommendation interface 410 may include one or more recommended content items 420. In particular embodiments, recommended content item 420 may be an advertisement (e.g., a movie trailer).

Social-networking system 160 may also select a media-content item as a recommended content item 420 based on any number of suitable additional factors, including, as an example and not by way of limitation, an episode or series being new, a new season of a show premiering, a media-content item being promoted by social-networking system 160 or a third-party content provider, trending topics or media-content items on an online social network (e.g., trending in a user's news feed, among social connections of the user, or on a larger scale, among users in a particular geographic region), social-networking interactions with other users (e.g., a social-connection of a user may have recommended a particular show in a messenger conversation on the online social network), any other suitable factors, or any combination thereof.

Social-networking system 160 may send recommended content items 420 to media-player device 320 with instructions to send the media-content items to display screen 310 for display to the users in the audience. In particular embodiments, social-networking system 160 may send, with the content recommendations, instructions to display the content recommendations in a particular spot on content recommendation interface 410, next to another particular content item, for a period of time, at a certain time, to a particular combination of users, any other suitable instructions for displaying the content recommendations, or any combination thereof.

Figure 5:
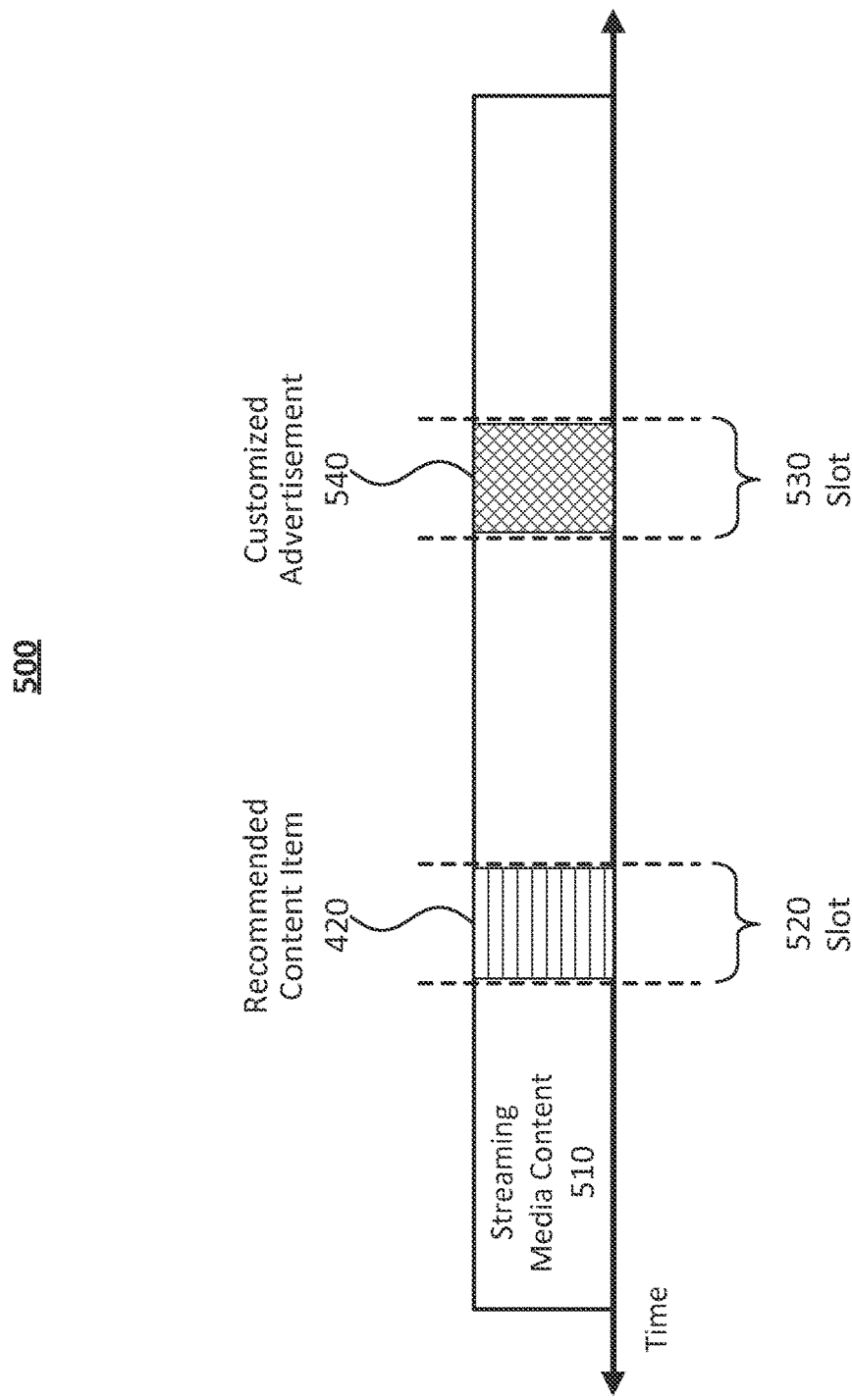
FIG. 5 illustrates an example customized advertisement and an example recommended content item spliced into streaming media content.

FIG. 5 illustrates an example customized advertisement 540 and an example recommended content item 420 spliced into streaming media content 510. Streaming media content 510 is depicted in FIG. 5 as spanning a particular length on a time axis. Streaming media content 510 may be provided by a third-party content provider or may be content generated by social-networking system 160. Slots 520 and 530 are shown in streaming media content 510. Although depicted as having slots 520 and 530, streaming media content 510 may have any suitable number of slots 520 and 530 reserved for insertion of a media-content item (e.g., a recommended content item 420 or customized advertisement 540). Customized advertisement 540 is shown as being spliced into streaming media content 510 at slot 530. Recommended content item 420 is shown as being spliced into streaming media content 510 at slot 520. Social-networking system 160 may send, with customized advertisement 540 and recommended content item 420, metadata indicating a placement, within streaming media content 510, of the respective customized advertisement 540 or recommended content item 420. As an example and not by way of limitation, instructions may indicate that customized advertisement 540 should be placed in slot 530 (e.g., at 10 minutes into the stream) and not in slot 520 (e.g., at 90 seconds into the stream).

In particular embodiments, streaming media content 510 may be an advertisement. Slots 520 and 530 may be slots in which recommended content items 420 may be inserted in order to customize the advertisement to the viewing audience. As an example and not by way of limitation, streaming media content 510 may be an automobile advertisement for a particular brand, and social-networking system may determine which recommended content item 420 to insert into slots 520 and 530 in order to maximize the value and/or relevance of the advertisement to the viewing audience. In the same example, social-networking system 160 may determine, based on the social-networking information and watch-history information of the users in the audience that one or more of the users are sports-car enthusiasts. Social-networking system 160 may then send instructions to media-player device 320 to insert a media-content item featuring the brand's sports car (e.g., the advertisement may be associated with multiple possible media-content item options, and the inserted media-content item may be selected from these options). In another example and not by way of limitation, social-networking system 160 may determine, based on the social-networking information and watch-history information of the users in the audience that one or more of the users have young children. Social-networking system 160 may then send instructions to media-player device 320 to insert a media-content item featuring the brand's family-friendly automobile.

In particular embodiments, social-networking system 160 may select the one or more media-content items (e.g., customized advertisement 540 or recommended content item 420) additionally based on criteria of the supplying third-party content-provider. These criteria may include, as an example and not by way of limitation, guidelines for placing the media-content item (e.g., not adjacent to this type of content or preferably in a slot 520 or 530 during a particular content program or advertisement), an amount that the third-party content provider pays per conversion, interaction with, or view of an advertisement or content recommendation, an amount that the third-party content provider pays per display of the advertisement or content recommendation, any other suitable criteria, or any combination thereof. In particular embodiments, social-networking system 160 may send guidelines retrieved from a third-party content provider for placing a selected media-content item as instructions with the selected media-content item to media-player device 320. Media-player device 320 may cause display screen 310 to present the selected media-content item in accordance with the guidelines.

In particular embodiments, social-networking system 160 may select the one or more media-content items based on a highest value to the social-networking system 160. The value may be calculated based on, as an example and not by way of limitation, engagement potential (e.g., likelihood that one or more users in an audience will be interested in the one or more media-content items), revenue (e.g., from a third-party content provider based on placement of one or more media-content items), any other suitable criteria, or any combination thereof.

In particular embodiments, social-networking system 160 may send more than one customized advertisement 540 or recommended content item 420 to media-player device 320 with instructions to take a vote from users in the audience which of the customized advertisements 540 or recommended content items 420 each would rather watch. The vote may be posed, as an example and not by way of limitation, as streaming media content 510 reaches a slot 520 or 530. The users may be given a period of time to vote (e.g., via their client systems 130), and media-player device 320 may either display the winning customized advertisement 540 or recommended content item 420 after the vote or select one of the customized advertisements 540 or recommended content items 420 to display if the period of time expires without a winning customized advertisement 540 or recommended content item 420 being selected by the vote.

Although this disclosure describes and illustrates particular embodiments of FIGS. 4-5 as being implemented by social-networking system 160, this disclosure contemplates any suitable embodiments of FIGS. 4-5 occurring on any suitable interface and as being implemented by any suitable platform or system. As an example, and not by way of limitation, particular embodiments of FIGS. 4-5 may be implemented by media-player device 320. Although FIGS. 4-5 describe particular types of media-content items, this is by way of illustration not by way of limitation, and any type of media-content item may be presented in the examples depicted in FIGS. 4-5. Furthermore, although this disclosure describes and illustrates particular components, devices, or systems carrying out particular steps of the method of FIGS. 4-5, this disclosure contemplates any suitable combination of any suitable components, devices, or systems carrying out any suitable steps of the method of FIGS. 4-5.

Figure 6:
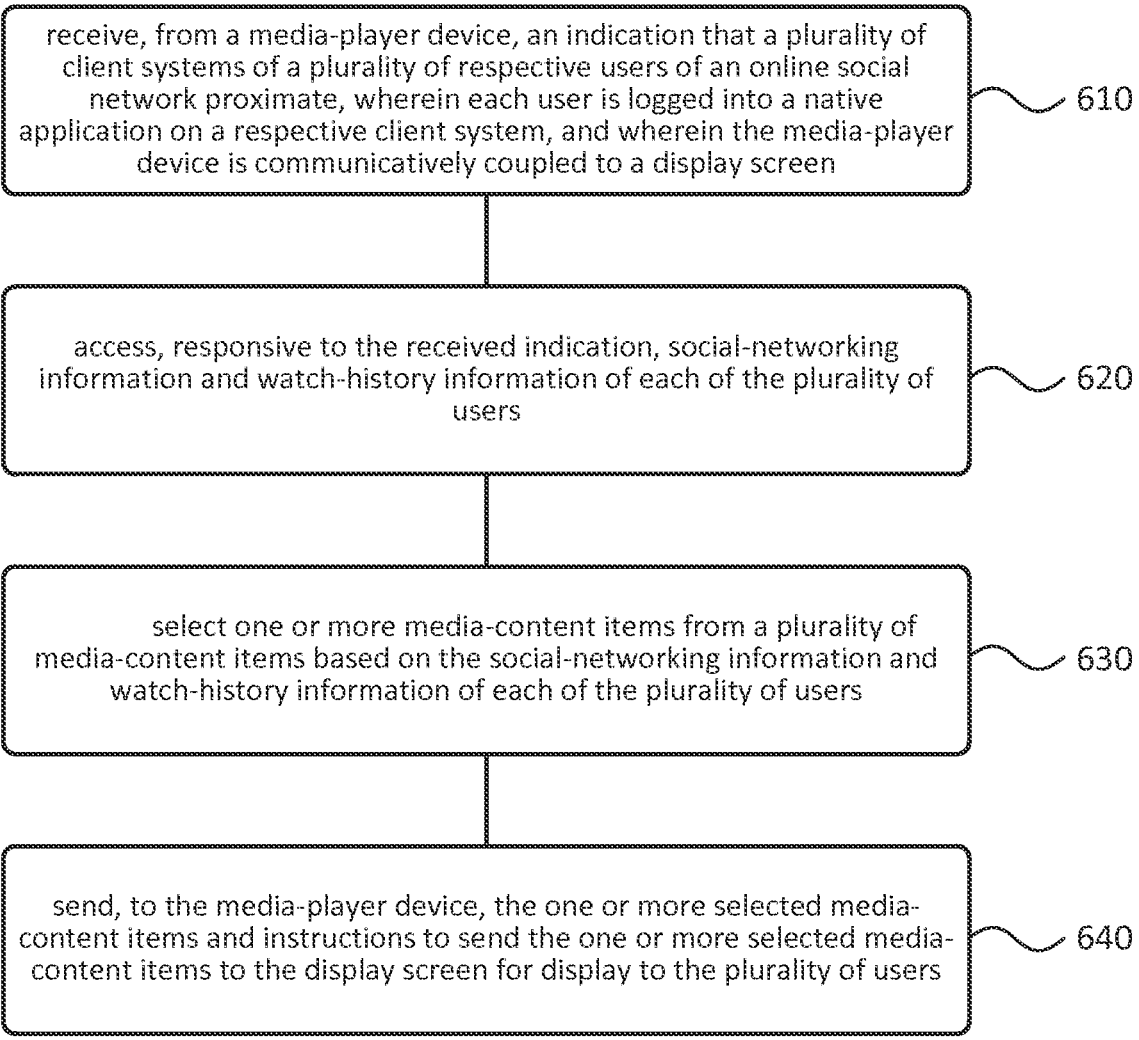
FIG. 6 illustrates an example method for sending media-content item selections to a media-player device.

FIG. 6 illustrates an example method for sending media-content item selections to a media-player device 320. At step 610, social-networking system 160 may receive, from a media-player device associated with a social-networking system, an indication that a plurality of client systems of a plurality of respective users of the online social network are proximate to the media-player device, wherein each of the plurality of users is logged into a native application associated with the social-networking system on a respective client system, and wherein the media-player device is communicatively coupled to a display screen. At step 620, social-networking system 160 may access, responsive to the received indication, social-networking information and watch-history information of each of the plurality of users. At step 630, social-networking system 160 may select one or more media-content items from a plurality of media-content items based on the social-networking information and watch-history information of each of the plurality of users. At step 640, social-networking system 160 may send, to the media-player device, the one or more selected media-content items and instructions to send the one or more selected media-content items to the display screen for display to the plurality of users. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for sending media-content item selections to a media-player device 320 including the particular steps of the method of FIG. 6, this disclosure contemplates any suitable method for sending media-content item selections to a media-player device 320 including any suitable steps, which may include all, some, or none of the steps of the method of FIG. 7, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the first querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
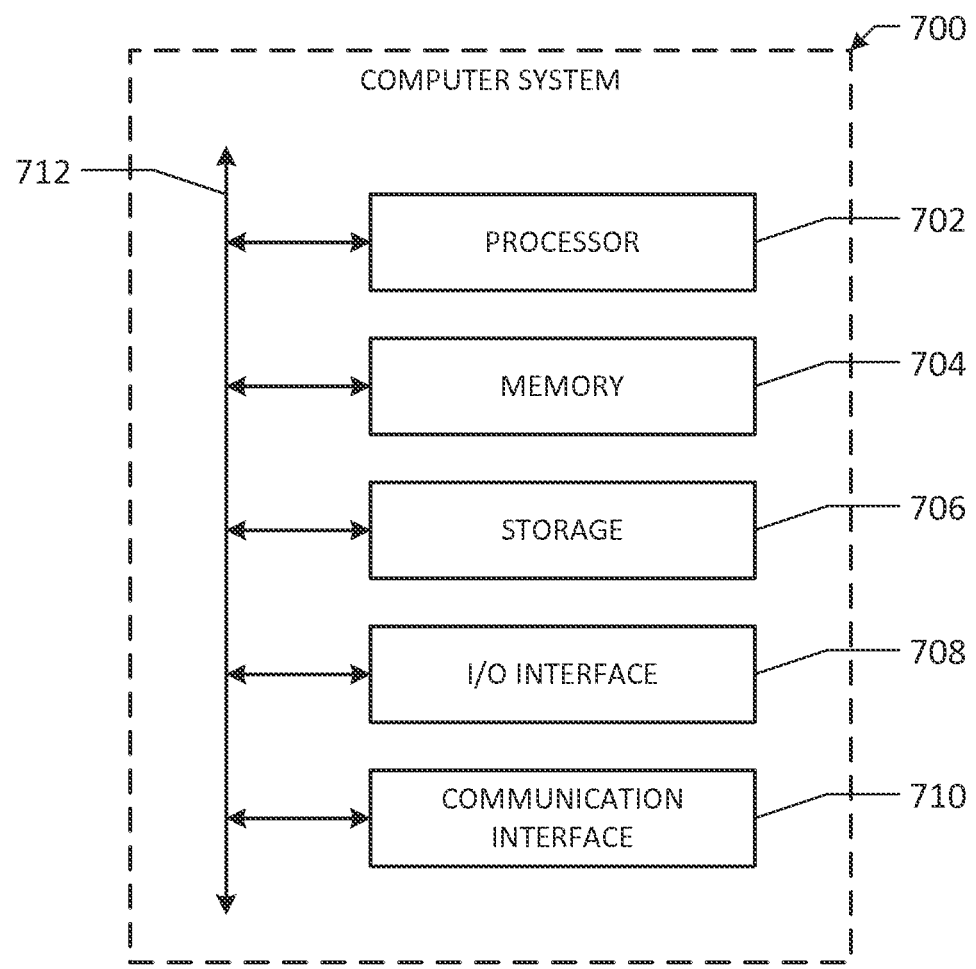
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:

receiving, from a media-player device, an indication that a plurality of client systems of a plurality of respective users of the online social network are currently proximate to the media-player device, wherein each of the plurality of users is currently logged into the online social network via a native application associated with the online social network on their respective client system, wherein at least one client system of the plurality of client systems is currently in a wireless communication with the media-player device via the native application, and wherein the media-player device is communicatively coupled to a display screen;

accessing, from user profiles associated with the respective users from the online social network responsive to the received indication, particular social-networking information and watch-history information of each of the plurality of users based on privacy preferences of the respective user, wherein the privacy preferences specify what social-networking information and watch-history information are accessible by the online social network;

determining one or more commonalities between the plurality of users based on an analysis of the accessed social-networking information and watch-history information of the plurality of users;

selecting one or more media-content items from a plurality of media-content items based on (1) the determined one or more commonalities between the plurality of users, and (2) a plurality of content-user affinity coefficients, wherein each content-user affinity coefficient is a measure of a probability that a particular user of the plurality of users will interact on the online social network via the native application with the selected media-content item of the plurality of media-content items; and sending, to the media-player device, the one or more selected media-content items and instructions to send the one or more selected media-content items to the display screen for display to the plurality of users.

2. The method of claim 1, wherein selecting the one or more media-content items is further based on context information.

3. The method of claim 2, wherein the context information comprises one or more of geographic-location information, time of day, and weather information.

4. The method of claim 1, wherein the particular social-networking information of each of the plurality of users comprises demographic information of the one or more users.

5. The method of claim 1, wherein the plurality of users comprise a first user, the first user being registered as an owner of the media-player device, and one or more second users, the one or more second users being registered as guest users of the media-player device.

6. The method of claim 5, wherein the online social network comprises a social graph comprising a plurality of nodes and a plurality of edges connecting the nodes, each of the edges between two of the nodes representing a single degree of separation between them, the nodes comprising:

a first node corresponding to the owner of the media-player device; and one or more second nodes corresponding to the one or more guest users of the media-player device.

7. The method of claim 6, wherein social-networking information of the owner comprises one or more user-user affinity coefficients of the first node with respect to one or more second nodes corresponding to the one or more guest users.

8. The method of claim 7, wherein the user-user affinity coefficient is based on one or more edges connecting the first node to the one or more second nodes.

9. The method of claim 7, wherein selecting the one or more media-content items is further based on the one or more user-user affinity coefficients.

10. The method of claim 7, wherein the first node is within one degree of separation from each second node in the social graph.

11. The method of claim 1, wherein the one or more media-content items comprise at least one advertisement.

12. The method of claim 1, wherein the one or more media-content items comprise at least one recommendation.

13. The method of claim 1, wherein at least one of the plurality of media-content items is retrieved from at least one third-party content provider.

14. The method of claim 13, wherein selecting the one or more media-content items is further based on criteria set by the at least one third-party content provider.

15. The method of claim 14, wherein the criteria comprise guidelines for placing the at least one media-content item retrieved from the at least one third-party content provider, the guidelines being retrieved from the at least one third-party content provider.

16. The method of claim 14, wherein the criteria comprise an amount to be paid by the at least one third-party content provider per display of the at least one media-content item retrieved from the at least one third-party content provider.

17. One or more computer-readable non-transitory storage media embodying software that is operable when executed to:
receive, from a media-player device, an indication that a plurality of client systems of a plurality of respective users of the online social network are currently proximate to the media-player device, wherein each of the plurality of users is currently logged into the online social network via a native application associated with the online social network on their respective client system, wherein at least one client system of the plurality of client systems is currently in a wireless communication with the media-player device via the native application, and wherein the media-player device is communicatively coupled to a display screen;
access, from user profiles associated with the respective users from the online social network responsive to the received indication, particular social-networking information and watch-history information of each of the plurality of users based on privacy preferences of the respective user, wherein the privacy preferences specify what social-networking information and watch-history information are accessible by the online social network;
determine one or more commonalities between the plurality of users based on an analysis of the accessed social-networking information and watch-history information of the plurality of users;
select one or more media-content items from a plurality of media-content items based on (1) the determined one or more commonalities between the plurality of users, and (2) a plurality of content-user affinity coefficients, wherein each content-user affinity coefficient is a measure of a probability that a particular user of the plurality of users will interact on the online social network via the native application with the selected media-content item of the plurality of media-content items; and
send, to the media-player device, the one or more selected media-content items and instructions to send the one or more selected media-content items to the display screen for display to the plurality of users.

18. A system comprising: one or more processors; and a memory coupled to the processors comprising instructions executable by the processors, the processors being operable when executing the instructions to:
receive, from a media-player device, an indication that a plurality of client systems of a plurality of respective users of the online social network are currently proximate to the media-player device, wherein each of the plurality of users is currently logged into the online social network via a native application associated with the online social network on their respective client system, wherein at least one client system of the plurality of client systems is currently in a wireless communication with the media-player device via the native application, and wherein the media-player device is communicatively coupled to a display screen;
access, from user profiles associated with the respective users from the online social network responsive to the received indication, particular social-networking information and watch-history information of each of the plurality of users based on privacy preferences of the respective user, wherein the privacy preferences specify what social-networking information and watch-history information are accessible by the online social network;
determine one or more commonalities between the plurality of users based on an analysis of the accessed social-networking information and watch-history information of the plurality of users;
select one or more media-content items from a plurality of media-content items based on (1) the determined one or more commonalities between the plurality of users, and (2) a plurality of content-user affinity coefficients, wherein each content-user affinity coefficient is a measure of a probability that a particular user of the plurality of users will interact on the online social network via the native application with the selected media-content item of the plurality of media-content items; and
send, to the media-player device, the one or more selected media-content items and instructions to send the one or more selected media-content items to the display screen for display to the plurality of users.

19. The method of claim 1, wherein each content-user affinity coefficient is calculated based on a type of a relationship between the particular user and the particular media-content item.

20. The method of claim 1, wherein each content-user affinity coefficient quantifies a strength of a relationship between the particular user and the particular media-content item.

21. The method of claim 1, wherein each content-user affinity coefficient is calculated based on one or more actions of the particular user performed with respect to the particular media-content item.

22. The system of claim 18, wherein selecting the one or more media-content items is further based on context information.

23. The system of claim 22, wherein the context information comprises one or more of geographic-location information, time of day, and weather information.

24. The system of claim 18, wherein the particular social-networking information of each of the plurality of users comprises demographic information of the one or more users.

25. The system of claim 18, wherein the plurality of users comprise a first user, the first user being registered as an owner of the media-player device, and one or more second users, the one or more second users being registered as guest users of the media-player device.

26. The system of claim 25, wherein the online social network comprises a social graph comprising a plurality of nodes and a plurality of edges connecting the nodes, each of the edges between two of the nodes representing a single degree of separation between them, the nodes comprising:
 a first node corresponding to the owner of the media-player device; and
 one or more second nodes corresponding to the one or more guest users of the media-player device.

27. The system of claim 26, wherein social-networking information of the owner comprises one or more user-user affinity coefficients of the first node with respect to one or more second nodes corresponding to the one or more guest users.

28. The system of claim 27, wherein the user-user affinity coefficient is based on one or more edges connecting the first node to the one or more second nodes.

29. The system of claim 27, wherein selecting the one or more media-content items is further based on the one or more user-user affinity coefficients.

30. The system of claim 27, wherein the first node is within one degree of separation from each second node in the social graph.

31. The system of claim 18, wherein the one or more media-content items comprise at least one advertisement.

32. The system of claim 18, wherein the one or more media-content items comprise at least one recommendation.

33. The system of claim 18, wherein at least one of the plurality of media-content items is retrieved from at least one third-party content provider.

34. The system of claim 33, wherein selecting the one or more media-content items is further based on criteria set by the at least one third-party content provider.

35. The system of claim 34, wherein the criteria comprise guidelines for placing the at least one media-content item retrieved from the at least one third-party content provider, the guidelines being retrieved from the at least one third-party content provider.

36. The system of claim 34, wherein the criteria comprise an amount to be paid by the at least one third-party content provider per display of the at least one media-content item retrieved from the at least one third-party content provider.

37. The system of claim 18, wherein each content-user affinity coefficient is calculated based on a type of a relationship between the particular user and the particular media-content item.

38. The system of claim 18, wherein each content-user affinity coefficient quantifies a strength of a relationship between the particular user and the particular media-content item.

39. The system of claim 18, wherein each content-user affinity coefficient is calculated based on one or more actions of the particular user performed with respect to the particular media-content item.

40. The method of claim 1, wherein the determined one or more commonalities between the plurality of users correspond to one or more concepts, and wherein selecting the one or more media-content items based on the determined one or more commonalities between the plurality of users comprises selecting one or more media-content items based on the one or more concepts corresponding to the determined one or more commonalities between the plurality of users, wherein each selected media-content item is associated with one or more of the concepts.

41. The method of claim 1, wherein selecting the one or more media-content items from the plurality of media-content items is further based on one or more privacy settings associated with each of the plurality of media-content items, wherein the privacy settings specify whether the media-content item is accessible by each of the plurality of users.

* * * * *